Jan. 27, 1953   R. B. MUNDAY ET AL   2,626,482
APPARATUS FOR IRRIGATION
Filed Sept. 7, 1948   3 Sheets-Sheet 2

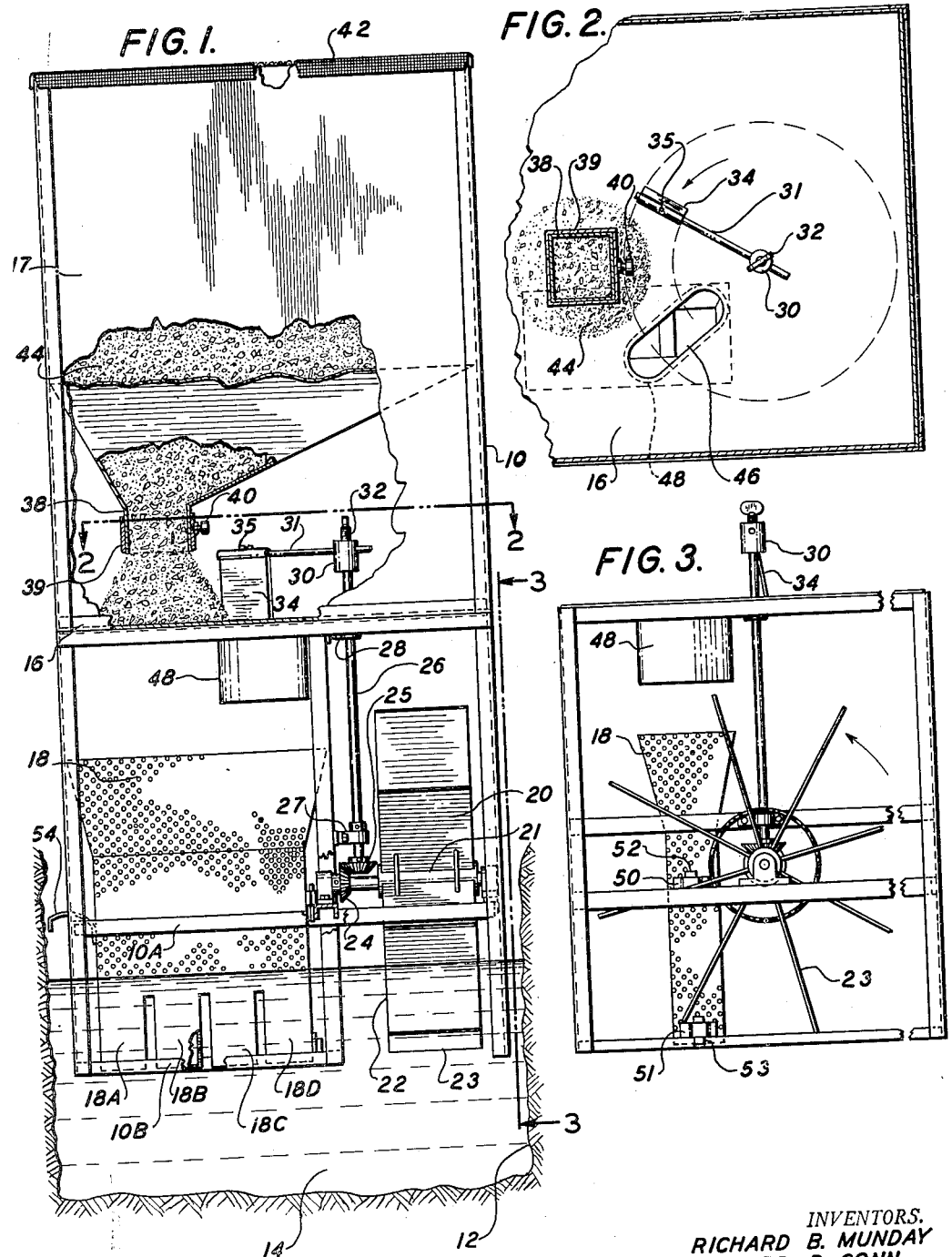

INVENTORS.
RICHARD B. MUNDAY
RICHARD D. CONN
BY
James B. Christie
ATTORNEY

Jan. 27, 1953  R. B. MUNDAY ET AL  2,626,482
APPARATUS FOR IRRIGATION
Filed Sept. 7, 1948  3 Sheets-Sheet 3

INVENTORS.
RICHARD B. MUNDAY
RICHARD C. CONN
BY
James B. Christie
ATTORNEY

Patented Jan. 27, 1953

2,626,482

UNITED STATES PATENT OFFICE 2,626,482

APPARATUS FOR IRRIGATION

Richard B. Munday, Altadena, and Richard D. Conn, Arcadia, Calif.

Application September 7, 1948, Serial No. 48,128

17 Claims. (Cl. 47—1)

This invention is concerned with the solution of soluble constituents of granular materials in liquid, and particularly to solution of mixtures containing ingredients having different solubilities or insoluble ingredients. It finds its principal applications in the solution of so-called dry fertilizers in irrigation water.

In many agricultural districts, and particularly in areas such as California, in which irrigation is practiced on a large scale, it has become the practice to introduce fertilizing elements to the soil by dissolving them in the irrigation water. There are a number of advantages accruing from such practice, not the least of which is the large saving in labor as compared with that involved in the distribution of dry fertilizers over the area to be covered. Another advantage in many instances lies in the fact that solubilized fertilizers have a higher availability to the plants so that a given crop will require less solubilized fertilizer than dry fertilizer. In short there is more efficient utilization. Nevertheless, as practiced heretofore, the application of fertilizer with irrigation water has been expensive.

It has been the practice to make concentrated solutions of fertilizer compounds in a central plant, shipping these concentrated solutions to the point of application in acidproof containers and the like. The cost of shipping and returning the containers, plus the freight on the water in transit has raised the cost of the operation substantially. Efforts to avoid this practice through the solution of dry fertilizers at the irrigation ditch have not been markedly successful, primarily because the several fertilizing compounds which go to make a "mix" have varying solubilities and because of the tendency of the dispensing apparatus to clog. The net result has been that the easily soluble ingredients have been dissolved out faster than the less soluble constituents with a consequent non-uniform distribution of the fertilizing elements.

As a result of our investigations we have developed a simple and effective means for applying dry fertilizer in the irrigation water. The apparatus is designed to operate automatically without care for a considerable period. It may be set up in association with the irrigation ditch with the assurance that for several hours it will properly dispense fertilizer at the desired rate.

The apparatus of the invention may be employed to dissolve and dispense almost any type of mixed fertilizer, including those containing nitrogen, phosphorus or potash in various soluble forms together with other addition agents. The less insoluble matter present, the better the operation, although considerable proportions of insolubles may be tolerated. Most so-called "dry" fertilizer mixes contain a substantial percentage of insolubles, either present originally in the fertilizing compounds which go to make the mix or added as filler. These insoluble materials tend to interfere with proper solution, also tend to clog conventional apparatus employed for application. Moreover, as indicated above, the solubilities of fertilizing compounds vary markedly so that some dissolve rapidly in the restricted amounts of water, while others dissolve slowly even in large quantities of water. The apparatus of the present invention is designed specifically to overcome these difficulties.

Benefits accruing from the invention in the application of fertilizer may be summarized as follows:

1. Certain difficultly soluble fertilizers, such as ammonium phosphate, may be applied with the irrigation water in proper ratio with more soluble compounds.

2. "High anaylsis" fertilizers may be employed without fillers and without danger of burning the crop. This saves handling of inert material, extra containers, mixing labor, etc.

3. There is an increased efficiency in the utilization by the plants of the fertilizer applied.

4. A growing crop may be fertilized at any time, even after plant growth makes it impossible to introduce heavy equipment into the field.

5. The objectionable properties of fillers, present in the majority of fertilizer mixes, are specifically avoided in the apparatus design.

In accomplishing the foregoing beneficial results, the invention contemplates an apparatus for dispensing granular and powdered solids in a stream of liquid, the combination which comprises a hopper, a permeable basket disposed at least partially in the liquid stream and spaced below the hopper, and means for causing the solids to flow in a discontinuous stream from the hopper into the basket.

In a preferred form of the invention this means for causing the solids to flow from the hopper into the basket is actuated by means of a water wheel forming an integral part of the apparatus of the invention. By placing the apparatus in relation to an irrigation ditch so that the water wheel is motivated by the water flowing through the ditch, the proportioning of the fertilizer into the irrigation stream is controlled by the water wheel. In this manner any auxiliary power means are completely eliminated.

Another highly important feature of the invention is the separation of the hopper and the basket. In one form of the invention the basket comprises a perforated open topped receptacle partially immersed in the water flowing through the irrigation ditch and positioned to receive the material to be dissolved in the irrigation water. In another embodiment of the invention the basket comprises a perforated tray open at both ends and at the top. This latter embodiment is particularly suited for use with fertilizer mixes containing appreciable proportions of insoluble "filler."

The apparatus is so constructed that the path of the flow of powdered or granular material between the hopper and the basket is discontinuous. This prevents water from rising, by capillary action into the hopper when fertilizer backs up in the basket. It has been found heretofore, that when material is discharged directly from the hopper into a dispensing basket or the like capillary action will cause water to migrate into the hopper if the fertilizer backs up from the basket to the hopper. This causes clogging and prevents proper operation of the device. This difficulty has been eliminated in accordance with our invention by providing a two-stage flow between the hopper and the dispensing basket.

These and other aspects of our invention will be more easily understood in the light of the following detailed description which is illustrated by the accompanying drawing in which:

Fig. 1 is an elevation view of one embodiment of the invention;

Fig. 2 is a plan view taken on the line 2—2 of Fig. 1;

Fig. 3 is a partial side elevation taken on the line 3—3 of Fig. 1;

Figure 7:
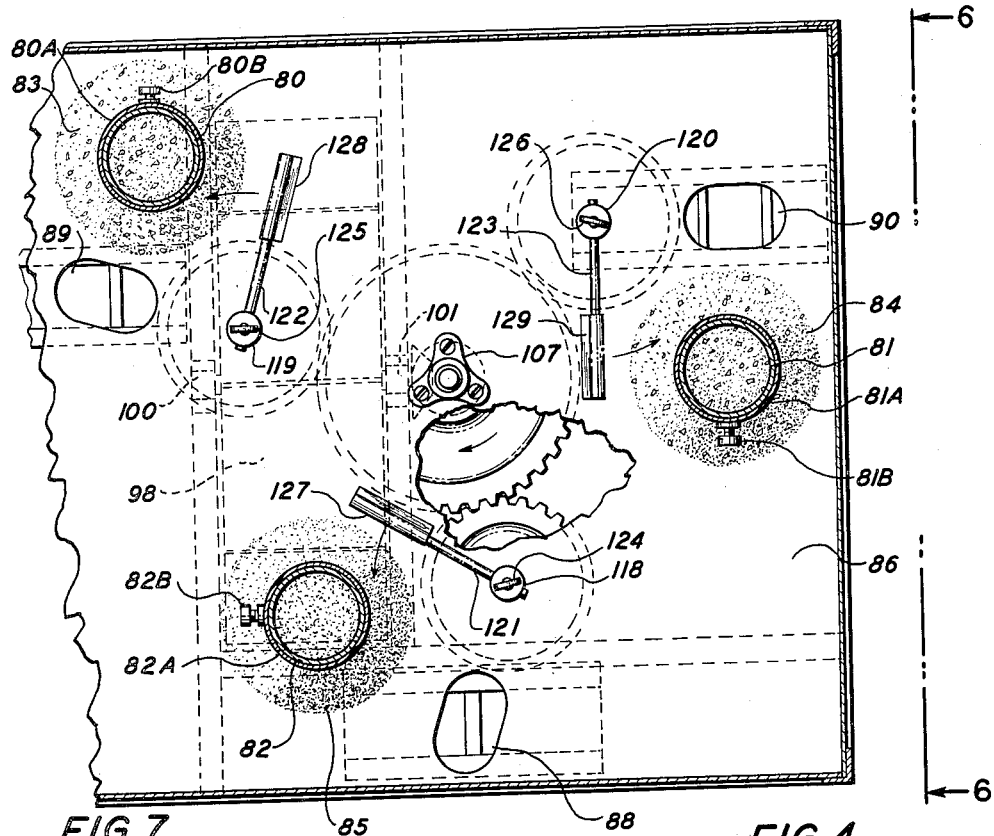
Fig. 7 is a plan view taken on the line 7—7 of Fig. 6.

Referring to Figs. 1, 2 and 3, the apparatus includes a framework 10, which may be suspended in any suitable means above an irrigation ditch 12 in which water 14 is flowing in a direction perpendicular to the plane of the drawing. The framework 10 is divided into an upper and lower section by a transverse plate or feeding table 16 which separates a hopper 17 from a dispensing basket 18. A paddle wheel 20 is mounted on a shaft 21 which is journaled at opposite ends to horizontal members of the framework 10. The paddle wheel 20 may be of any suitable design and is mounted to the framework so that the lower portion of the several paddle blades 22, 23 etc. dip into the irrigation water 14. The inner end of the axle 21 carries a bevel gear 24 which engages a bevel gear 25 at the lower end of a vertical shaft 26. The shaft 26 is journaled to a vertical member of the framework 10 through bearings 27, 28 and extends through the plate 16. The upper end of the shaft 26 carries a collar 30 through which an arm 31 is journaled perpendicular to the shaft 26. The arm 31 is slideable in the collar 30 and is held in any set position by a set screw 32. A wiper or scraper 34 is pivotally affixed to the outer end of the arm 31 and is held in any set position by set screw 35. The scraper 34 rotates with the shaft 26 responsive to rotation of the paddle wheel 20 induced by water flow in the irrigation ditch 12. The rotation of the scraper 35 is shown in the dotted lines in the plan view of Fig. 2.

The hopper 17 funnels into a discharge chute 38 which is provided with a vertically adjustable sleeve 39 held by a set screw 40 in any fixed position on the chute 38. The upper end of the hopper 17 is closed by a cover 42 which is conveniently a coarse screen or perforated plate which serves to screen large aggregates from any fertilizer dumped into the hopper.

Fertilizer 44 flowing from the hopper chute 38 falls upon the plate 16, forming a conical pile thereon the size of which depends upon the natural angle of repose of the material and upon the height of the outlet above the plate. The size of the pile may be adjusted by adjusting the sleeve 39 upwardly or downwardly as desired.

The plate 16 has an opening 46 in the path of rotation of the scraper 34 and adjacent the fertilizer pile developed on the plate beneath the hopper. The opening 46 opens into a chute 48 which in turn opens into the basket 18, the upper end of which is spaced below the lower end of the chute 48.

As above described the spacing of the basket 18 below the chute 48 as well as the two stage delivery of the fertilizer from the hopper into the retainer 18 is an important feature of the invention. Should the basket 18 clog and overflow no harmful effects would result since the same proportion of fertilizer would be thereafter discharged into the irrigation stream by the overflow. However, should the same situation arise with the hopper and basket in direct connection a continuous column of fertilizer would be established between the hopper and the basket through which water would be sucked by capillary action into the hopper. The possibility of such objectionable counter current water flow is completely eliminated in the apparatus of the invention.

The basket 18 is suspended from cross members 10A, 10B by means of cleats 50, 51 attached to the basket and adapted to hook over ears 52, 53 projected above the cross members 10A, 10B. An arm 54 extends from the opposite end of the basket and hooks over a cross member at the opposite side of the framework corresponding to the cross member 10A.

As shown in Figs. 1, 2 and 3 the basket comprises an elongated rectangular container of perforated metal disposed transversely with respect to the line of water flow. To provide for more intimate contact between the water and fertilizer in the basket the lower end of the basket is shaped to form four legs 18A, 18B, 18C, 18D separated from each other by small spaces through which the water may pass. The upper end of the basket is flared to insure reception of all of the fertilizer discharged from the chute 38.

The basket generally must be permeable, i. e. permit migration of liquid therethrough, so that the soluble fertilizer will be dissolved and carried away. This permeability can be obtained by using perforated material, say metal, plastic, wood, etc. in the construction of the basket or with a wire mesh basket. A perforated basket is preferred over a wire mesh basket because it is more rugged.

An important feature of the invention is the ease with which the quantity of fertilizer discharged into the water stream may be adjusted. As above described, the area of the base of the pile of fertilizer discharged from the hopper 17 on the plate 16 will be a function of the normal angle of respose of the mixture as well as of the distance between the hopper outlet and the plate 16. By the provision of an adjustable collar 39 this distance can be altered so as to correspondingly alter the pattern of the pile on the plate 16. At a given setting of the scraper 34 the amount of fertilizer discharged through the opening 46 will be of course a function of the "bite" of the scraper into the fertilizer pile. Additionally, the "bite" may be adjusted by adjustment of the arm 31 in the sleeve 30. Any reduction in the radius of rotation of the scraper 34 will reduce the portion of the pile pushed through the opening 46 upon each revolution of the scraper. Similarly the disposition of the scraper with respect to the shaft 31 may be altered by rotating the scraper about the shaft. In this manner the lower edge of the scraper may be raised above the surface of the plate 16 any desired distance so as to reduce the quantity of fertilizer moved by the scraper.

Although a paddle wheel has been shown as an essentially simple and economical means of motivating the apparatus it is to be understood that the paddle wheel is intended to represent any type of motivating means. Thus the function of the paddle wheel may be performed by an internal combustion motor or by an electric motor as desired. However, such a motor is not necessary, inasmuch as we have found that ample power is supplied by the paddle wheel, and the paddle wheel possesses many advantages over a motor. Thus in operations in out-of-the-way places where servicing, fuel storage, power supply, etc. are difficult to provide, use of a paddle wheel is to be preferred. Even in areas where these limitations are not encountered a paddle wheel is preferable from an economic and maintenance standpoint.

Figures 4, 6:
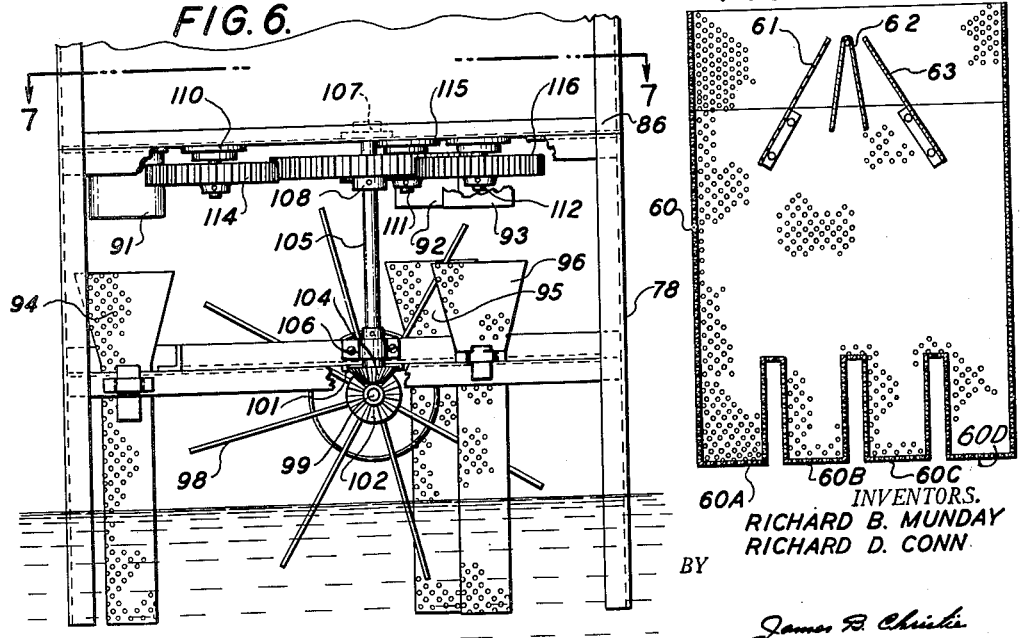
Fig. 4 is a sectional elevation of a modified basket.
Fig. 6 is a partial end elevation of an embodiment of the invention adapted to separately feed three different fertilizers or mixes simultaneously into the irrigation stream.

In the apparatus as shown in Fig. 1, fertilizer is discharged from the chute 48 into the basket 18 and generally fills the legs 18C, 18D before overflowing into the legs 18A, 18B. A modified form of basket is shown in Fig. 4. The basket 60 shown in Fig. 4 is made of perforated metal and is provided with spaced legs 60A, 60B, 60C, 60D as in the foregoing embodiment. In the basket of Fig. 4 a plurality of baffles 61, 62, 63 are mounted across the open upper end of the basket and serve to channel fertilizer falling into the basket into the several legs. Either of the baskets shown in Fig. 1 or that shown in Fig. 4 will operate satisfactorily.

Figure 5:
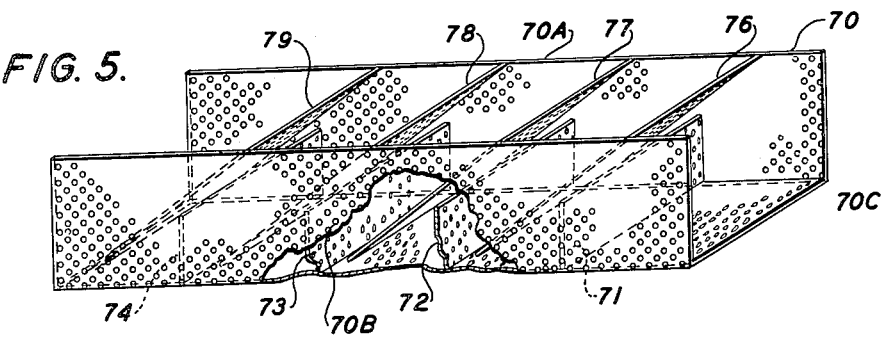
Fig. 5 is a perspective view of an alternative type of basket particularly adapted to use with fertilizer mixes containing an appreciable proportion of insoluble filler.

In Fig. 5 there is shown in perspective a basket 70 in the nature of a tray or trough which is adapted to replace the basket shown in the apparatus of Figs. 1 to 3. In practice the trough 70 may be suspended from the framework 10 of the apparatus of Fig. 1 in a manner similar to the basket 18. The trough is so mounted that the level of the water 14 comes a little above the mid point of the sides 70B of the trough. A number of transverse perforated baffles 71, 72, 73, 74 extend upwardly from the perforated bottom 70C of the trough to about to the midpoint of the sides 70A, 70C. Overlying each of the perforated vertical baffles 71, 72, etc. are sloping baffles 76, 77, 78, 79. Baffle 76 extends across the trough 70 overlying the baffle 71 and extending the upper edge of the baffle 71 and extending downwardly towards the next succeeding baffle 72. The trough 70 is particularly designed for retaining fertilizer mixes which contain appreciable quantities of insoluble fillers. The trough is placed so that the fertilizer falls into the forward end, to the right of the first baffle 71, as viewed in Fig. 5. The succeeding pairs of vertical and sloping baffles serve to retard the progress of the granular or powdered materials carried through the trough by water flow from right to left as shown in Fig. 5. By the time any given quantity of fertilizer has been carried past or through the several baffles any soluble ingredients therein have been dissolved and any insoluble ingredients are discharged from the left hand end of the trough into the water stream. With this type of basket there is no danger of any build up of excessive quantities of insoluble material so as to impair the solution of the soluble materials. Use of this basket constitutes preferred practice when employing mixes containing large quantities of insoluble filling.

The embodiment of the invention as shown in partial elevation in Fig. 6 and in plan in Fig. 7 is identical in principle to the apparatus shown in Figs. 1 and 2. In compounding fertilizers for particular application difficulty is often encountered because of comparatively great differences in particle size between various ingredients. When a fertilizer containing ingredients of widely varying particle size is introduced into the hopper 17 in Fig. 1, stratification takes place over a period of time so that after a number of hours the composition of the material discharged from the chute 38 may not represent the composition of the material originally introduced into the hopper 17. Even though there is substantially no vibration in the apparatus very fine particles may tend to find their way toward the bottom of the hopper and be thus discharged in inordinately large proportion from the hopper. The apparatus of Figs. 6 and 7 is specifically designed to overcome this difficulty when it is desired to employ fertilizer mixes wherein such discrepancy in particle size is apt to be encountered. Thus the apparatus of Fig. 7 is provided with three hoppers (not shown) or a single sectionalized hopper having three separate outlet chutes 80, 81, 82 serving to form three piles 83, 84, 85 of fertilizer on a plate 86. The outlet chutes are preferably provided with vertically adjustable sleeves 80A, 81A, 82A, held on the chutes by set screws 80B, 81B, 82B.

The plate 86 serves a similar function to the plate 16 and differs therefrom in being provided with three separate openings 88, 89, 90 opening into a like number of chutes 91, 92 and 93 respectively. Each of the chutes 91, 92, 93 discharges into a separate perforated basket or retainer 94, 95, 96. The last mentioned baskets may be of the trough type as illustrated in Fig. 5.

In this apparatus a paddle wheel 98 is mounted on a shaft 99 which is journaled through bearings 100, 101 fixed to the framework 78. As in the foregoing embodiment the shaft 99 carries a beveled gear 102 which engages a bevel gear 104 mounted on the lower end of a vertical shaft 105. The vertical shaft, which is journaled through bearings 106, 107 carries a spur gear 108 which rotates beneath the table 86. Three shafts 110, 111, 112 are journaled through the plate 86 and are provided with spur gears 114, 115, 116 respectively which engage the gear 108 on the shaft 105. The upper ends of the shafts 110, 111, 112 are provided with separate collars 118, 119, 120 respectively, through which arms 121, 122, 123 are slidably mounted. Set screws 123, 124, 125 fix the positions of the arms in the collars. A separate scraper 127, 128, 129 is mounted on the outer end of each of the several arms.

The operation of the apparatus of Figs. 6 and 7 is essentially similar to that of the apparatus of Figs. 1 and 3. A separate fertilizer, for example ammonium nitrate, ammonium phosphate, potash, is disposed in each of the three hoppers or bins (not shown). The fertilizers are discharged from the spouts 80, 81, 82 to form the piles 83, 84 and 85 on the table 86. Rotation of the paddle wheel 98, induced by water flow in the irrigation ditch is transmitted through the gear arrangement described to cause rotation of the scrapers 127, 128, and 129. The several scrapers may be independently adjusted with respect to the radius of revolution and angle of inclination so as to discharge any desired amount of the particular pile engaged thereby through the several openings 88, 89, and 90 in the plate 86. The materials discharged through these several openings are discharged into the baskets 94, 95, and 96 and are picked up by the irrigation water percolating through the basket.

It is obvious that by suitable adjustment of the spacing of the fertilizer piles on the table and corresponding rearrangement of the scrapers and by synchronizing the rotation of the scrapers to prevent interference, increments of the several piles may be successively discharged through a single opening in the plate 86. In such case a single basket disposed beneath the single opening and partially immersed in the water will suffice to disperse the several fertilizers in the stream.

Figure 8:
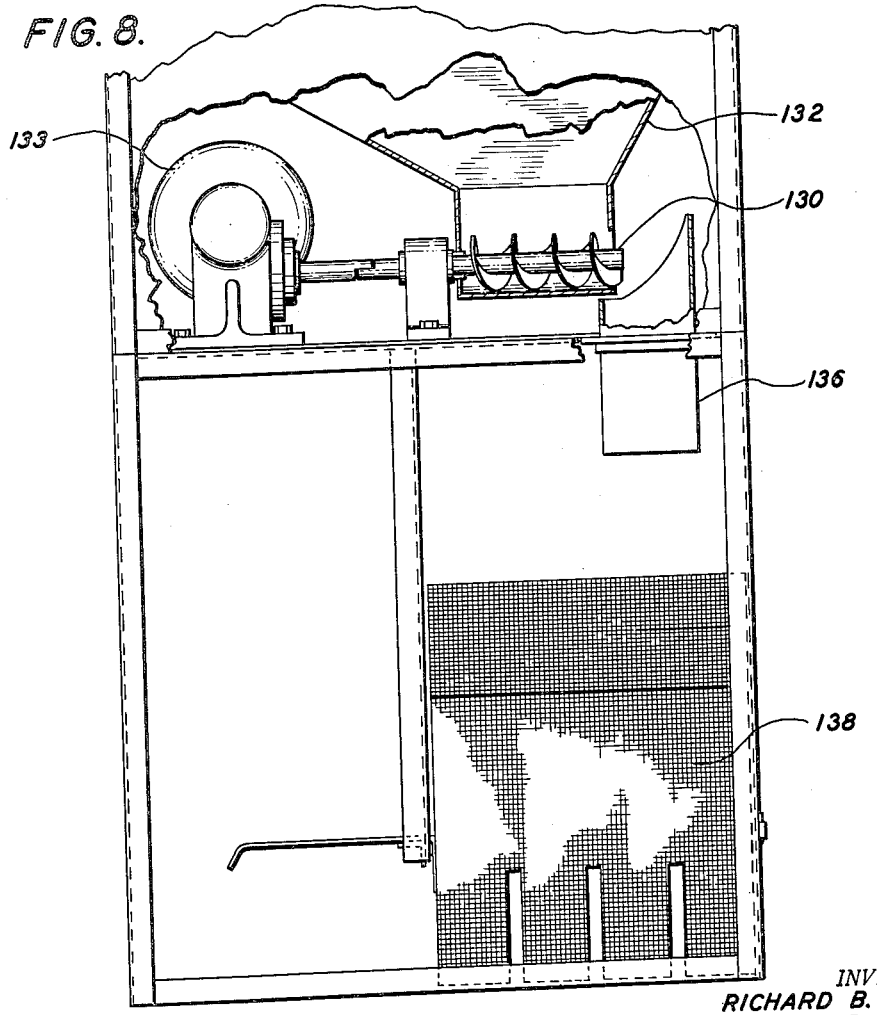
Fig. 8 is a partial sectional elevation showing a modified means for feeding from the hopper into the basket.

Although the invention has been particularly illustrated in relation to the use of rotating scrapers actuated by a water wheel, the embodiment shown in Fig. 8 is also satisfactory. In this embodiment a screw conveyor 130 is journaled in the lower end of a hopper 132 and is operated by a gear reduction motor 133. Rotation of the screw conveyor discharges fertilizer from the hopper 132 through a shute 136 into a basket 138 which may be of the type shown in Figs. 1 and 4. For the reasons given above the embodiments of the apparatus employing a water wheel are to be preferred over the embodiment incorporating motor driven feeding means inasmuch as the operating cost and maintenance cost are considerably reduced by use of the water wheel.

We claim:

1. In apparatus for dissolving granular and powdered solids in a stream of liquid, the combination which comprises a hopper, a perforated basket stationarily disposed at least partially in the stream of liquid and spaced below the hopper, a paddle wheel operable by the stream of liquid to rotate independently of the basket, and means operable responsive to the rotation of the paddle wheel for regulating the flow of solids from the hopper into the basket.

2. Apparatus according to claim 1 including means for interrupting the flow of solids from the hopper to the basket whereby there can be no back up of solids from the basket to the hopper.

3. In apparatus for dissolving granular and powdered material in a stream of liquid, the combination which comprises a hopper mounted in a framework above the stream, a table beneath the hopper, a section of the table being adapted to receive material discharged from the hopper, an opening in the table spaced from said section, a permeable basket disposed beneath the opening to receive material falling therethrough, the basket being at least partially immersed in the liquid, and powdered scraping means for scraping material discharged from the hopper to the opening.

4. In apparatus for dissolving granular and powdered material in a stream of liquid, the combination which comprises a hopper mounted in a framework above the stream and having an outlet spout projecting from its bottom side, a table beneath the hopper adapted to receive material discharged from the outlet spout, an opening in the table spaced from the part of the table lying substantially beneath the spout, a perforated basket disposed beneath the opening to receive material falling therethrough, the basket being at least partially immersed in the liquid, and powered scraping means for scraping material discharged from the hopper to the opening.

5. Apparatus according to claim 4 wherein the outlet spout includes a vertically adjustable sleeve whereby the outlet can be raised and lowered with respect to the table.

6. Apparatus according to claim 4 wherein the basket is elongated in a direction transverse to the water flow and is divided into a plurality of separate spaced compartments suspended in the water and opening into a single overhead compartment into which the material is charged.

7. Apparatus according to claim 4 wherein the basket is an elongated trough disposed with its longitudinal axis parallel to the liquid flow.

8. Apparatus according to claim 4 wherein the basket is an elongated trough having perforated sides and open ends, a plurality of perforated vertical baffles extending from side to side of the trough and projecting from the bottom of the trough approximately half way up the sides, and a like number of perforated inclined baffles, one of said inclined baffles being disposed above each of said vertical baffles and extending to a point behind and below the top of the vertical baffle.

9. Apparatus according to claim 4 wherein the hopper is provided with a cover of wire mesh, the mesh size being large as compared to the average particle size of the material to be charged to the hopper and adapted to prevent large agglomerates from entering the hopper as the material is fed through the top.

10. In apparatus for dissolving granular and powered material in an irrigation ditch, the combination which comprises a hopper mounted in a framework above the ditch, a table beneath the hopper, a section of the table being adapted to receive material discharged from the hopper, an opening in the table spaced from said section, a paddle wheel mounted on an axle beneath the table and projecting into the ditch so that flow of water in the ditch causes rotation of the paddle wheel, a vertical shaft rotatably mounted to the framework and extending through the table, means engaging the axle and shaft so that rotation of the former causes rotation of the latter, a scraper mounted to the upper end of the shaft and rotatable above the top of the table by the shaft, the locus of rotation of the scraper being adjustable to include a selected part of the section of the table which receives material from the hopper and a part of the opening, and a perforated basket disposed beneath the opening to receive material falling therethrough and projecting into the ditch in the path of water flowing in the ditch.

11. In apparatus for dissolving granular and powdered material in an irrigation ditch, the combination which comprises a hopper mounted in a framework above the stream, a table beneath the hopper, a section of the table being adapted to receive material discharged from the hopper, an opening in the table spaced from said section, a paddle wheel mounted on an axle beneath the table and extending into the ditch so that flow of water in the ditch causes rotation of the paddle wheel, a vertical shaft rotatably mounted to the framework, and extending through the table, means engaging the axle and shaft so that rotation of the former causes rotation of the latter, a scraper, adjustable mounting means for mounting the scraper to the upper end of the shaft so that the scraper is rotatable above the top of the table by the shaft, and a perforated basket disposed beneath the opening to receive material falling therethrough and projecting into the ditch in the path of water flowing in the ditch.

12. Apparatus according to claim 11 wherein the adjustable mounting means comprises a collar affixed to the shaft, the collar being provided with a hole therethrough transverse to the longitudinal axis of the shaft, an arm slidably mounted through the hole, a set screw in the collar for holding the arm in fixed position therein, the scraper being mounted on the outer end of the arm and rotatable about the longitudinal axis of the arm, and means for fixing the position of the scraper with respect to the arm.

13. In apparatus for dispersing different materials in a stream of liquid, the combination which comprises a number of hoppers corresponding to the number of separate materials to be dispersed mounted in a framework above the stream, a table beneath the hoppers adapted to receive in separate piles the materials discharged from the several hoppers, an opening in the table, a paddle wheel mounted on an axle beneath the table and partially immersed in the liquid so that flow of liquid causes rotation of the paddle wheel, a vertical drive shaft rotatably mounted to the framework, means engaging the axle and shaft so that rotation of the former causes rotation of the latter, a number of vertical shafts projecting through the table and rotatable responsive to rotation of the drive shaft, a scraper mounted to the upper end of each shaft and rotatable above the top of the table, the locus of rotation of the scrapers being adjustable to include a selected part of the several piles of material discharged on the table and a part of the opening, and a perforated basket disposed beneath the opening to receive material falling therethrough, the basket being at least partially immersed in the liquid.

14. In apparatus for separately dispersing a number of different materials in a stream of liquid, the combination which comprises a number of hoppers corresponding to the number of different materials mounted in a framework above the stream, a table beneath the hoppers, discharge chutes on the several hoppers adapted to discharge material onto spaced sections of the table, a separate opening in the table associated with and spaced from each of said sections, a paddle wheel mounted on an axle beneath the table and partially immersed in the liquid so that flow of liquid causes rotation of the paddle wheel, a vertical drive shaft rotatably mounted to the framework, means engaging the axle and shaft so that rotation of the former causes rotation of the latter, a number of vertical shafts extending through the table and rotatable responsive to rotation of the drive shaft, a scraper mounted to the upper end of each shaft and rotatable above the top of the table by the shaft, the locus of rotation of the several scrapers being adjustable to include a selected part of one section of the table and a part of the associated opening, and a perforated basket disposed beneath each opening to receive material falling therethrough, the several baskets being at least partially immersed in the liquid.

15. In apparatus for dissolving granular and powdered material in an irrigation ditch, the combination which comprises a hopper mounted in a framework above the ditch, a table beneath the hopper, a section of the table being adapted to receive material discharged from the hopper, an opening in the table spaced from said section, a paddle wheel mounted on an axle beneath the table and projecting into the ditch so that flow of water in the ditch causes rotation of the paddle wheel, a vertical shaft rotatably mounted to the framework and extending through the table, means for engaging the axle and the shaft to produce rotation of the shaft responsive to rotation of the axle, a scraper mounted to the shaft and rotatable above the table by the shaft, the locus of rotation of the scraper being adjustable to include a selected part of said section of the table and the opening so that rotation thereof scrapes a portion of the solids discharged on said section through the opening into the ditch.

16. In apparatus for dissolving granular and powdered material in an irrigation ditch, the combination which comprises a hopper mounted in a framework above the ditch, a table beneath the hopper, a section of the table being adapted to receive material discharged from the hopper, an opening in the table spaced from said section, a paddle wheel mounted on an axle beneath the table and projecting into the ditch so that flow of water in the ditch causes rotation of the paddle wheel, a vertical shaft rotatably mounted to the framework and extending through the table, means engaging the axle and shaft so that rotation of the former causes rotation of the latter, and a scraper mounted to the upper end of the shaft and rotatable above the top of the table by the shaft, the locus of rotation of the scraper being adjustable to include a selected part of the section of the table which receives material from the hopper and a part of the opening.

17. In apparatus for dissolving granular and powdered solids in a stream of liquid, the combination which comprises a hopper, a perforated basket stationarily disposed at least partially in the stream of liquid and spaced below the hopper, a paddle wheel operable by the stream of liquid to rotate independently of the basket, and means operable responsive to the rotation of the paddle wheel for causing the flow of solids from the hopper into the basket.

RICHARD B. MUNDAY.
RICHARD D. CONN.

REFERENCES CITED

The following references are of record in the file of this patent:

UNITED STATES PATENTS

| Number | Name | Date |
| --- | --- | --- |
| 734,412 | Feurt | July 21, 1903 |
| 1,139,352 | De Vito | May 11, 1915 |
| 1,173,534 | Ryan | Feb. 29, 1916 |
| 1,868,914 | Prizer | July 26, 1932 |
| 1,882,911 | Richards | Oct. 18, 1932 |
| 1,910,235 | Burkett | May 23, 1933 |
| 2,044,489 | Karlsson-Ygger | June 16, 1936 |
| 2,546,317 | Prizer | Mar. 27, 1951 |